Sept. 10, 1963 S. SCHNEIDER 3,103,627
MICROWAVE TRANSMISSION MOLECULAR IDENTIFICATION SYSTEM
EMPLOYING WAVE PROPAGATION MODE DETECTORS
Filed May 18, 1960
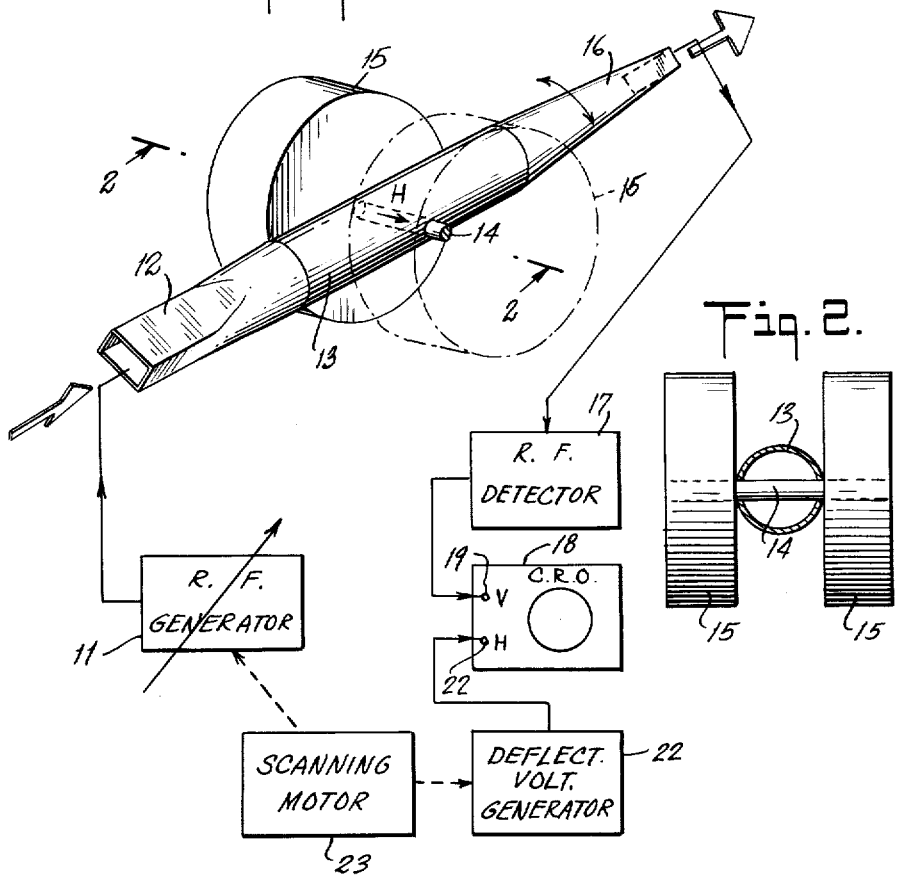
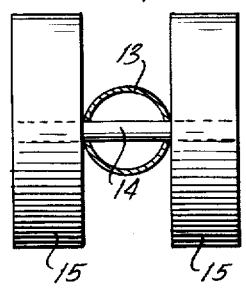
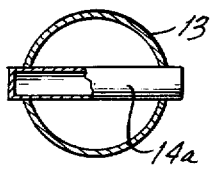
INVENTOR.
SEYMOUR SCHNEIDER
BY Darby & Darby
ATTORNEYS

United States Patent Office 3,103,627
Patented Sept. 10, 1963

3,103,627
MICROWAVE TRANSMISSION MOLECULAR IDENTIFICATION SYSTEM EMPLOYING WAVE PROPAGATION MODE DETECTORS
Seymour Schneider, Bayside, N.Y., assignor to Polarad Electronics Corporation, Long Island City, N.Y., a corporation of New York
Filed May 18, 1960, Ser. No. 29,863
6 Claims. (Cl. 324—58.5)

The present invention relates to apparatus whereby the microwave absorption characteristic of various compositions can be studied and whereby compositions can be identified by their microwave absorption characteristics. More particularly the invention relates to such a system wherein microwave radiation of one polarization is selectively absorbed (or reflected) to a greater degree than that of a different polarization resulting in a rotation in the polarization vector of the microwave signal which can be detected with a high degree of sensitivity.

Apparatus has been previously devised for the study of material by their microwave radiation absorption characteristics. Various complicated apparatus have been designed utilizing bridge circuits and other complex devices to endeavor to measure microwave absorption characteristics with sufficient sensitivity, so that the apparatus can be a useful tool in the identification of materials and their properties.

The present invention provides apparatus for the study of microwave absorption characteristics of samples of material which is remarkably simple in construction and at the same time provides a high degree of sensitivity and a wide operative frequency range.

It is an object of the present invention to provide apparatus for detecting small degrees of absorption of microwave energy in a relatively small sample of material and for detecting small changes in the degree of such absorption with changes in conditions such as magnetic field strength for example.

It is another object of the invention to provide apparatus of this type wherein the frequency of the microwave radiation or the strength of the magnetic field through the sample or some other parameter is varied cyclically and a display is presented of variations in microwave absorption relative to the variation in such parameters.

Other objects and advantages will be apparent from a consideration of the following description in conjunction with the appended drawings, in which:

FIGURE 1 is an isometric partially schematic view of apparatus for studying microwave absorption characteristics in accordance with the present invention;

FIGURE 2 is a sectional view taken along the line 2—2 in FIGURE 1; and

FIGURE 3 is a sectional view partially broken away of an alternative form of the invention in which a hollow sample holder is used for the study of a liquid or gaseous sample, FIGURE 3 also being a view as would be seen taken along the line 2—2 of FIGURE 1.

Referring now to FIGURE 1, a radio frequency generator 11 is shown having a variable frequency output. The frequency range of the RF generator 11 will be selected to include frequencies at which materials anticipated to be under study will have significant absorption bands, and illustratively the frequency of the RF generator may range from hundreds of mc. to tens of thousands of mc.

The radio frequency signal from the generator 11 is fed to a waveguide section 12 of the rectangular to circular transition type. The waveguide section 12 is in turn coupled to feed a circular waveguide section 13. The waveguide sections 12 and 13 are designed to launch a $TE_{11}$ mode in the hollow circular waveguide 13. The orientation of the mode is determined by the orientation of the waveguide section 12 and is independent of frequency in the range of the $TE_{11}$ mode.

A thin sample of material 14 is inserted in the circular waveguide 13 with its axis at an angle (45° for example) to the direction of the E vector in the center of the mode.

In some cases it will be desired to study paramagnetic materials in the presence of a steady or slowly varying magnetic field. Magnetic pole pieces 15 are provided to induce such a field in the sample 14; the magnetic field may be produced by either permanent or electromagnets.

Since sample 14 is relatively thin, the component of electric field perpendicular to sample 14 will be relatively unaffected by the presence of the sample. On the other hand the component of the electric field parallel to the rod 14 will be relatively strongly affected by the presence of the rod 14.

If a portion of the parallel electric field is absorbed by the rod, there will be a rotation of total resultant field that appears on the other side of the rod. This will result in a field component perpendicular to the orientation of the input $TE_{11}$ wave. An output coupler 16 is connected to the circular waveguide 13 and is rotatable with respect tereto. The coupler 16 may be rotated to a position perpendicular to the input $TE_{11}$ wave so that substantially the only component of the electric field due to the presence of the sample 14 will be detected at the output of waveguide coupler 16 and it will be detected without significant attenuation. Reflection from the sample 14 will be detected in substantially the same manner as described above for absorption.

In operation of the apparatus it may also be desired to detect departures from some initial condition of absorption and reflection. For example in the study of paramagnetic materials, the initial condition might be that with substantially no magnetic field in the sample 14. The fact that the output coupler 16 is rotatable allows one to set up initial conditions with a given frequency and magnetic field and rotate the output coupler 16 to produce a null from the output of the output coupler 16. This would indicate that the coupler 16 was oriented at right angles to the microwave field mode orientation after it passes the sample 14. Any change in the degree of absorption and reflection of the sample 14 will change the degree to which the microwave field is rotated and will correspondingly upset the null predetermined by the orientation of the output coupler 16.

The output from the coupler 16 may be fed to a radio frequency detector 17 and from thence to a cathode ray oscilloscope 18 where it may be connected to the vertical deflection terminal 19. Horizontal deflection voltage may be supplied from a deflection voltage generator 21 to horizontal deflection terminal 22 of the cathode ray oscilloscope 18. A scanning motor 23 is provided for varying the horizontal deflection voltage in synchronism with the variation in radio frequency generator frequency, thus providing on the cathode ray oscilloscope 18 a display of the absorption characteristic versus frequency in sample 14.

An accurate frequency versus absorption display is possible due to the fact that the null condition at the output of coupler 16 is substantially independent of frequency.

In some cases it may be desired to obtain a similar plot of two parameters, but it may be desired to vary the magnetic field applied to sample 14 rather than the frequency of the microwave signal. The apparatus illustrated in FIGURE 1 can obviously be readily modified to allow the scanning motor to cyclically vary the current to electromagnets providing the magnetic field and thus provide a plot of microwave absorption versus magnetic field in sample 14.

In some cases one may wish to study the microwave absorption characteristic of gaseous or liquid mediums, in which case the sample 14 may be replaced by a tubular sample holder 14a which may be filled with gaseous or liquid material. The sample holder 14a may be formed of low loss material such as "Teflon" (tetrofluoroethylene). In some cases it may be desirable to connect the tubular sample holder 14a to receive a continuous flow of gas or liquid and thus provide a continuous analysis of a flowing gas or liquid medium. If desired, in such a case the frequency could be maintained constant to detect the presence of a particular gas or liquid material. In such case the frequency could be selected to correspond with a strong frequency absorption band of the material sought to be detected.

From the foregoing description, it will be seen that apparatus of inherent simplicity and efficiency is provided for the study of microwave absorption characteristics of liquid gaseous and solid materials. In addition to those variations and modifications shown and suggested herein, it will be obvious that those of ordinary skill in the art will readily devise numerous other modifications and alterations within the scope of the present invention. Accordingly, the present invention is not to be construed to be limited solely to those embodiments shown or suggested but is to be limited solely by the appended claims.

What is claimed is:

1. Apparatus for the study of radio frequency radiation transmission properties of materials comprising a radio frequency transmission line capable of propagating a radio frequency mode characterized by an unidirectional electric field having a particular direction of orientation and extending throughout a portion of the cross-sectional area of said wave guide, said transmission line further being capable of supporting such radio frequency mode with a plurality of different orientations, means for generating radio frequency waves including a plurality of frequency components, means for launching said radio frequency waves in said transmission line in said aforesaid mode and with a predetermined orientation of said electric field, means for locating an elongated sample of material in the radio frequency field of said transmission line with a long dimension of said sample obliquely oriented with respect to the impinging electric field, means for detecting the presence of radio frequency waves propagating with electric field components oriented at an angle with respect to said predetermined orientation, and means responsive to the last said means for producing a display of the amplitude of said detected angularly oriented waves relative to their frequency.

2. Apparatus for the study of radio frequency radiation transmission properties of materials comprising a radio frequency transmission line capable of propagating a radio frequency mode characterized by an unidirectional electric field having a particular direction of orientation and extending throughout a portion of the cross-sectional area of said wave guide, said transmission line further being capable of supporting such radio frequency mode with a plurality of different orientations, means for launching radio frequency waves in said transmission line in said aforesaid mode and with a predetermined orientation of said electric field, means for locating an elongated sample of material in the radio frequency field of said transmission line with a long dimension of said sample obliquely oriented with respect to the impinging electric field, means for detecting the presence of radio frequency waves propagating with electric field components oriented at an angle with respect to said predetermined orientation, means for cyclically varying the frequency of said waves, and means responsive to the last two said means for producing a display of the amplitude of said detected angularly oriented waves relative to the instantaneous value of said frequency.

3. Apparatus for the study of radio frequency radiation transmission properties of materials comprising a radio frequency transmission line capable of propagating a radio frequency mode characterized by an unidirectional electric field having a particular direction of orientation and extending throughout a substantial portion of the cross-sectional area of said wave guide, said transmission line further being capable of supporting such radio frequency mode with a plurality of different orientations, means for launching radio frequency waves in said transmission line in said aforesaid mode and with a predetermined orientation of said electric field, means for locating an elongated sample of material in the radio frequency field of said transmission line with a long dimension of said sample obliquely oriented with respect to the impinging electric field, means for detecting the presence of radio frequency waves propagating with electric field components oriented at an angle with respect to said predetermined orientation, means for cyclically varying the frequency of said waves and means responsive to the last two said means for producing a display of the amplitude of said detected angularly oriented waves relative to the instantaneous value of said frequency.

4. Apparatus for the study of electromagnetic wave transmission characteristics of materials within a predetermined frequency range comprising a rectangular waveguide section capable of propagating the $TE_{11}$ mode of electromagnetic wave within said predetermined frequency range, a circular waveguide section capable of propagating said $TE_{11}$ mode of electromagnetic waves within said predetermined frequency range, means for connecting said circular and rectangular waveguide sections and for launching said $TE_{11}$ mode in said circular waveguide with an orientation corresponding to that of said rectangular waveguide, means for locating an elongated sample of material in said circular waveguide section with a long dimension of said sample obliquely oriented with respect to the electric field of impinging waves in said circular waveguide, an output rectangular waveguide section, and means for connecting said output rectangular waveguide section and said circular waveguide section, said output rectangular waveguide section being rotatable with respect to the first said rectangular waveguide section.

5. Apparatus for the study of electromagnetic wave transmission characteristics of materials within a predetermined frequency range comprising a rectangular waveguide section capable of propagating the $TE_{11}$ mode of electromagnetic wave within said predetermined frequency range, a circular waveguide section capable of propagating said $TE_{11}$ mode of electromagnetic waves within said predetermined frequency range, a transition waveguide section connected between said circular and rectangular waveguide sections for launching said $TE_{11}$ mode in said circular waveguide with an orientation corresponding to that of said rectangular waveguide, means for locating an elongated sample of material in said circular waveguide section with a long dimension of said sample obliquely oriented with respect to the electric field of impinging waves in said circular waveguide, an output rectangular waveguide section, and a circular to rectangular transition waveguide section connected between said output rectangular waveguide section and said circular waveguide section, said output rectangular waveguide section being rotatable with respect to said sample.

6. Apparatus for the study of electromagnetic wave transmission characteristics of materials within a predetermined frequency range comprising a rectangular waveguide section capable of propagating the $TE_{11}$ mode of electromagnetic wave within said predetermined frequency range, means for supplying a signal within said frequency range to said rectangular waveguide section, a circular waveguide section capable of propagating said $TE_{11}$ mode of electromagnetic waves within said predetermined frequency range, a transition waveguide section connected between said circular and rectangular waveguide sections for launching said $TE_{11}$ mode in said circular waveguide with an orientation corresponding to that of said rectangular waveguide, means for locating an elongated sample of material in said circular waveguide section with a long dimension of said sample obliquely oriented with respect to the electric field of impinging waves in said circular waveguide, an output rectangular waveguide section, and a circular to rectangular transition wave guide section connected between said output rectangular waveguide section and said circular waveguide section, said output rectangular waveguide section being rotatable with respect to the first said rectangular waveguide section, and means for detecting the output from said output rectangular waveguide section.

References Cited in the file of this patent
UNITED STATES PATENTS

| | | |
|---|---|---|
| 2,482,173 | Hagstrum | Sept. 20, 1949 |
| 2,524,290 | Hershberger | Oct. 3, 1950 |
| 2,599,753 | Fox | June 10, 1952 |
| 2,613,251 | Ebert | Oct. 7, 1952 |
| 2,644,930 | Luhrs | July 7, 1953 |
| 2,748,353 | Hogan | May 29, 1956 |
| 2,817,812 | Fox | Dec. 24, 1957 |
| 2,844,789 | Allen | July 22, 1958 |
| 2,952,296 | Kofoid | Sept. 13, 1960 |

FOREIGN PATENTS

| | | |
|---|---|---|
| 710,378 | Great Britain | June 9, 1954 |